Jan. 16, 1962 W. S. GILES 3,016,854
SOLDERING PUMP
Filed April 25, 1958 2 Sheets-Sheet 1

INVENTOR.
WILLIAM S. GILES
BY
McMorrow, Berman & Davidson
ATTORNEYS

Jan. 16, 1962 W. S. GILES 3,016,854
SOLDERING PUMP
Filed April 25, 1958 2 Sheets-Sheet 2
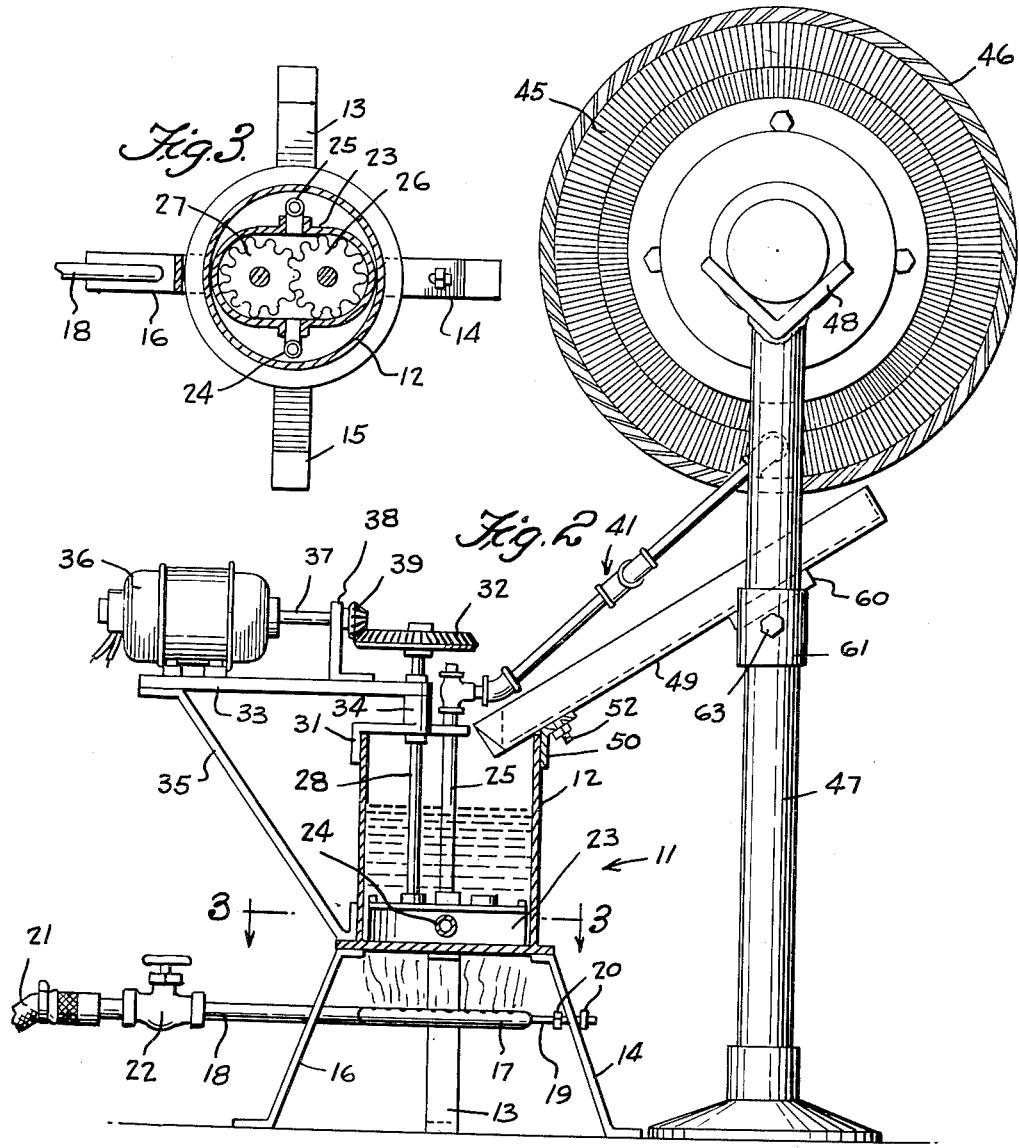
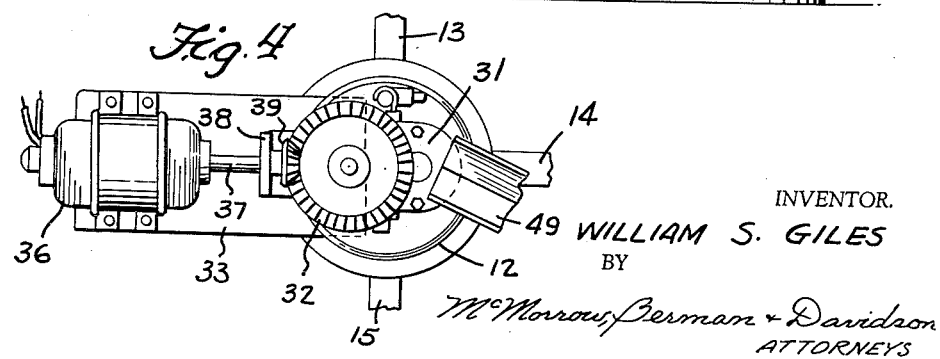
INVENTOR.
WILLIAM S. GILES
BY
McMorrow, Berman & Davidson
ATTORNEYS

United States Patent Office 3,016,854
Patented Jan. 16, 1962

3,016,854
SOLDERING PUMP
William S. Giles, % Giles Armature Electric Works Inc., 703 W. Stockton St., Marion, Ill.
Filed Apr. 25, 1958, Ser. No. 730,922
2 Claims. (Cl. 113—93)

This invention relates to soldering devices, and more particularly to an apparatus for heating solder and feeding same to surfaces to be soldered together, for example, for conveying the melted solder to the coil leads and to solder said coil leads to the commutator of a motor armature.

A main object of the invention is to provide a novel and improved soldering pump for heating solder and for conveying the molten solder to a desired location for application thereof, the apparatus being simple in construction, being relatively compact in size, and providing a means for neatly and economically utilizing solder to form desired connections.

A further object of the invention is to provide an improved device for heating and dispensing solder, said device involving inexpensive components, being efficient in operation, being provided with means for regulating the flow of solder from the outlet nozzle thereof, and being provided with means for returning excess solder to the main receptacle thereof.

Further objects and advantages of the invention will become apparent from the following description and claims, and from the accompanying drawings, wherein:

FIGURE 2 is a transverse vertical cross sectional view taken through the solder pump of FIGURE 1 and showing the armature in end view.

FIGURE 3 is a horizontal cross sectional view taken on the line 3—3 of FIGURE 2.

FIGURE 4 is a top view of the solder pot, the variable speed driving motor and fragmentary portions of other elements associated with the soldering pump device of FIGURES 1 and 2.

Figure 1:
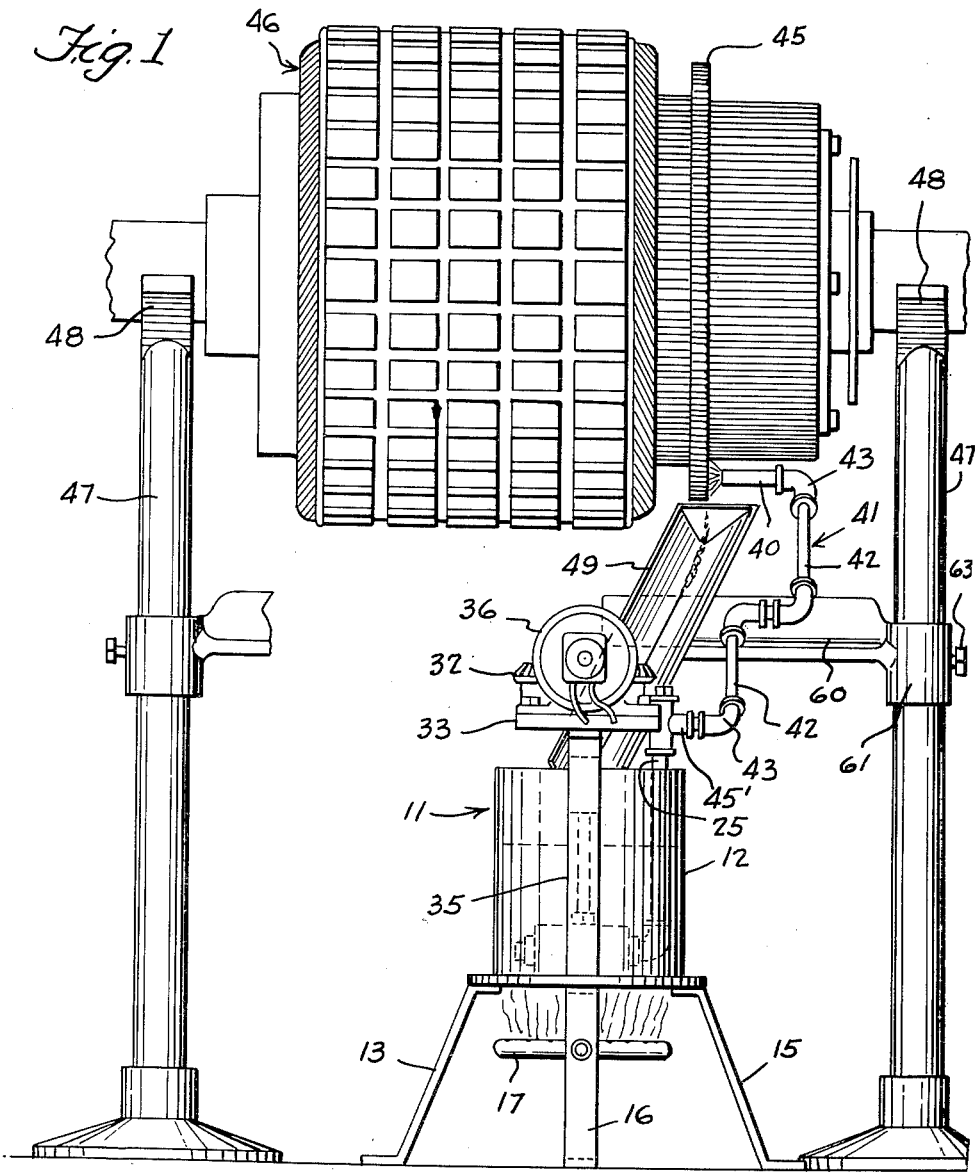
FIGURE 1 is a side elevational view of an improved solder pump constructed in accordance with the present invention, set up to solder the coil leads to the commutator of the armature in direct current motors and the end connections on wound rotor alternating current motors.
Figure 5:
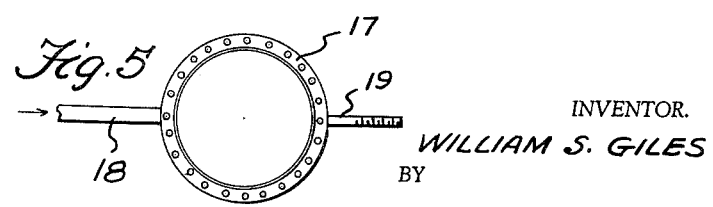
FIGURE 5 is a fragmentary top plan view of the gas burner employed with the soldering pot shown in FIGURES 1 and 2.

Referring to the drawings, the soldering apparatus is designated generally at 11 and comprises a solder pot 12 which is provided with a plurality of downwardly and outwardly inclined supporting legs 13, 14, 15 and 16, as shown in FIGURE 3, a gas burner 17 being disposed beneath the solder pot in heat-transmitting relation thereto. Thus, the gas supply pipe 18 extends through and is supported on the leg 16, the pipe 18 being rigidly secured to and being in communicative relationship with the annular gas burner 17, said gas burner being provided with a horizontal stud 19 extending therefrom diametrically opposite the supply pipe 18, said stud extending through the supporting leg 14 and being secured thereto by nuts 20, 20 threadedly engaged on the stud on opposite sides of leg 14, as shown in FIGURE 2.

A gas supply hose 21 is connected to the pipe 18 through a manually controlled valve 22.

Designated at 23 is a conventional gear pump which is disposed horizontally in the bottom of the solder pot 12, the gear pump having an inlet conduit 24 communicating with the interior of the pot 12 and being provided with the vertical outlet conduit 25 extending upwardly beyond the top of the solder pot 12.

The gear pump 23 comprises meshing gears 26 and 27 journaled on vertical axes within the housing of the gear pump, the gear 27 being connected to a vertical driving shaft 28 which extends upwardly beyond the top of the solder pot 12.

Secured to the top of the solder pot 12 is an angle bracket 31 through which the driving shaft 28 extends and in which said shaft is vertically and rotatably supported. The pump outlet conduit 25 likewise extends through the horizontal arm of the bracket 31 and is supported thereby in its vertical upstanding position. Secured to the top portion of the driving shaft 28 is a relatively large bevel gear 32.

A horizontal supporting plate 33 is engaged on an upstanding bearing collar 34 formed on the bracket 31, said bearing collar rotatably receiving the driving shaft 28. The outer end portion of the plate 33 is supported on an inclined brace bar 35 which connects the outer end portion of the plate 33 to the lower portion of the solder pot 12, as is clearly shown in FIGURE 2. Mounted on the plate member 33 is a variable speed electric motor 36 whose shaft 37 extends horizontally through a bearing bracket 38 secured on plate 33. Secured on the end portion of shaft 37 is a relatively small bevel gear 39 which meshes with the relatively large bevel gear 32, whereby the motor 36 is drivingly connected to the gear pump 23.

Designated at 40 is an outlet nozzle which is connected to the top end of the vertical outlet conduit 25 by an angularly adjustable conduit assembly 41 comprising a plurality of straight conduit sections 42 which are interconnected by elbows 43 and which is connected at one end to the stem portion of a T-fitting 45' mounted on the top end of the solder outlet conduit 25. The nozzle 40 is connected to the outermost elbow fitting 43. As will be readily apparent, the nozzle 40 may be oriented angularly in any desired position due to the flexibility of the angularly adjustable conduit assembly 41. In the arrangement illustrated in the drawings, the apparatus is set up so that solder will be discharged from the nozzle 40 to successively solder the coil leads to the commutator segments 45 of the rotor of the armature 46 of an electric motor, the armature being supported in a horizontal position, as shown in FIGURE 1, by vertical standards 47, 47 provided at their top ends with cradle elements 48 which engage beneath the opposed end portions of the shaft of rotor 46.

Designated at 49 is an inclined solder return trough which is mounted on the top edge of the solder pot 12, as by means of a suitable angle bracket 50 provided on the top marginal portion of the pot, the trough 49 extending upwardly and outwardly from the pot and being disposed beneath the nozzle 40, the trough being adjustable angularly around the axis of its fastening stud 52 so that it may be adjusted to a position beneath the discharge end of nozzle 40. The trough 49 is thus disposed beneath the nozzle and returns excess solder to the solder pot 12.

In operation the solder is heated in the pot 12 by the burner 17 so that it assumes a molten condition. The solder is supplied to the nozzle 40 by the action of the gear pump 23, the rate of supply being regulated in accordance with the adjusted speed of the variable speed motor 36. The excess solder drips downwardly into the trough 49 and flows back to the solder pot 12.

As will be readily apparent, the soldering operations on the armature 46 may be neatly and efficiently performed, since the connections of the coil leads to the commutator segments may be successively made by rotating the armature 46 around its axis on the cradle members 48, 48.

It will be understood that the various parts of the soldering apparatus above described which come into contact with the molten solder must be fabricated from metal which does not contain any of the constituent metals in the solder. Thus, the various parts of the apparatus which would come into contact with the solder must not contain brass, copper, tin alloy, or any other of the constituents of the solder. The aforesaid components of the apparatus, and particularly the solder conduit portions 25 and 41, and the components of the gear pump 23 are preferably fabricated from high grade steel.

As shown in FIGURES 1 and 2, suitable horizontally extending supporting arms 60 may be provided on the standards 47, said arms having collar portions 61 adjustably engaged on the standards, whereby the height of the arms 60 may be vertically adjusted. The collars 61 are provided with clamping screws 63 for securing same to the standards in vertically adjusted positions. The arms 60 may be employed to support the inclined solder return trough 49, as shown in FIGURES 1 and 2, to maintain the trough in its required position beneath the solder discharge nozzle 40.

While a specific embodiment of an improved soldering apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a soldering apparatus, a pair of spaced stationary vertical standards, respective cradle elements on the top ends of said standards rotatably supportingly engageable beneath the opposed end portions of the shaft of a motor armature, whereby to support said armature with its shaft in a horizontal position and with its coil leads exposed for soldering adjacent one of the standards, a solder pot located laterally adjacent the standards, a heater disposed beneath said pot in heat-transmitting relation thereto, a gear pump disposed horizontally on the bottom wall of the pot with the axes of the gears thereof perpendicular to said bottom wall and having an inlet port communicating with the interior of said pot, a variable speed electric motor mounted on the pot, a relatively small bevel gear on the shaft of the variable speed motor, said gear pump being provided with an upstanding driving shaft, a relatively large bevel gear secured on said driving shaft and meshingly engaging said small bevel gear, whereby said variable speed motor is drivingly connected to said pump, a vertical upstanding solder conduit connected to the outlet of said pump and extending upwardly from said pump, a horizontal discharge nozzle located between said standards and adjacent said one of the standards and parallel to said cradle elements, and angularly adjustable conduit means supportingly connecting said discharge nozzle to the top end of said solder conduit, said conduit means comprising a plurality of straight rigid conduit sections and elbow conduits rotatably connecting the ends of said conduit sections.

2. In a soldering apparatus, a pair of spaced stationary vertical standards, respective, generally V-shaped, upwardly facing cradle elements on the top ends of said standards rotatably supportingly engageable beneath the opposed end portions of the shaft of a motor armature, whereby to support said armature with its shaft in a horizontal position and with its coil leads exposed for soldering adjacent one of the standards, a solder pot located laterally adjacent the standards, a heater disposed beneath said pot in heat-transmitting relation thereto, a gear pump disposed horizontally on the bottom wall of the pot with the axes of the gears thereof perpendicular to said bottom wall and having an inlet port communicating with the interior of said pot, a variable speed electric motor mounted on the pot, a relatively small bevel gear on the shaft of the variable speed motor, said gear pump being provided with an upstanding driving shaft, a relatively large bevel gear secured on said driving shaft and meshingly engaging said small bevel gear, whereby said variable speed motor is drivingly connected to said pump, a vertical upstanding solder conduit connected to the outlet of said pump and extending upwardly from said pump, a horizontal discharge nozzle located between said standards and adjacent said one of the standards and parallel to said cradle elements, angularly adjustable conduit means supportingly connecting said discharge nozzle to the top end of said solder conduit, said conduit means comprising a plurality of straight rigid conduit sections and elbow conduits rotatably connecting the ends of said conduit sections, and an inclined solder return trough mounted on the top edge of said pot, extending upwardly and outwardly from said pot between the standards and being disposed beneath said solder discharge nozzle.

References Cited in the file of this patent

UNITED STATES PATENTS

| | | |
|---|---|---|
| 1,446,667 | Schulz | Feb. 27, 1923 |
| 1,910,687 | Freeburg | May 23, 1933 |
| 2,463,158 | Lorme et al. | Mar. 1, 1949 |
| 2,515,097 | Schryber | July 11, 1950 |
| 2,524,969 | Fairchild | Oct. 10, 1950 |
| 2,921,550 | Goodykoontz, et al. | Jan. 19, 1960 |